Figure 1:
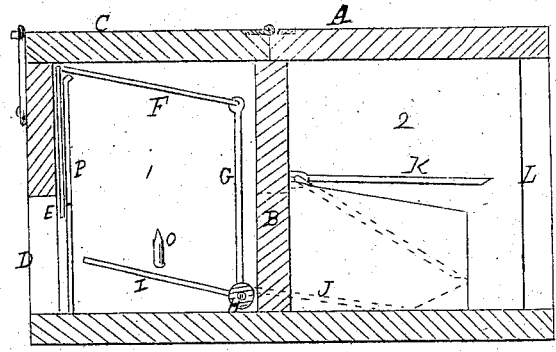
Figure 2:
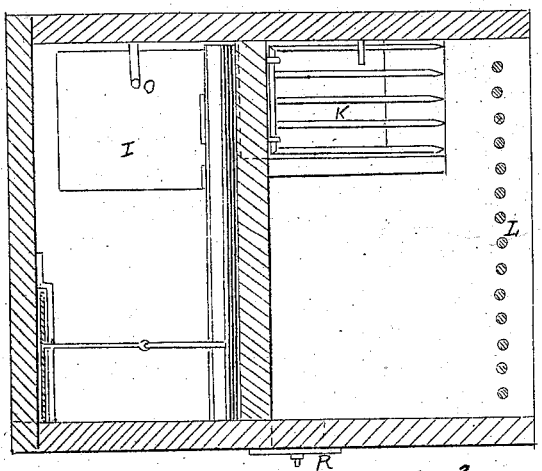
Figure 3:
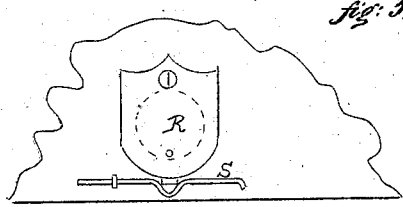

*A. C. Briant's Impt in Animal Traps*

PATENTED FEB 25 1868

No. 74886

Witnesses:
Cornelius Cox
Charles Blue

Inventor:
A. C. Briant
per Alexander Mason
atty

United States Patent Office.

A. C. BRIANT, OF LAFAYETTE, INDIANA.

*Letters Patent No. 74,886, dated February 25, 1868.*

IMPROVED ANIMAL-TRAP.

*The Schedule referred to in these Letters Patent and making part of the same.*

TO ALL WHOM IT MAY CONCERN:

Be it known that I, A. C. BRIANT, of Lafayette, in the county of Tippecanoe, and in the State of Indiana, have invented certain new and useful Improvements in Animal-Traps; and do hereby declare that the following is a full, clear, and exact description thereof, reference being had to the accompanying drawings, and to the letters of reference marked thereon.

In the annexed drawings, making part of this specification, A represents a box-trap, which is made of wood, and of any desirable or suitable size. This box is divided into two compartments, by means of a partition, B. There is a doorway in this partition, to allow the animals to pass from one compartment to the other. C represents a hinged door leading into the box from its top. At one end of the box is a doorway, D, which is opened or closed by a sliding or falling door, E. This door rises and falls between one end of the box and the plate or shield P. H represents a shaft, which is situated in compartment 1, near its bottom, and near the partition B, running crosswise of the box. This shaft is provided with two platforms, I and J, and also with a vertical rod, G. To the upper end of the rod G, one end of a cord, F, is secured. This cord, after passing over the plate P, is attached, at its other end, to the centre of the upper edge of door E. When the shaft H partially revolves or rocks, the rod G moves, so as to cause the cord F to raise the door E, or allow it to fall by its own gravity. The platform I is situated in compartment 1, in front of the doorway in partition B, while the other platform, J, extends through said doorway and into compartment 2. These platforms are so arranged and attached to the shaft, that when one of them has its outer end raised a little way from the bottom of the box, the end of the other one rests upon the bottom. The doorway of the partition B is protected by a wire door, K, which is inclined and situated in compartment 2, and hinged to the partition. This door is immediately over platform J. L represents a wire grating, in one end of the trap, to allow light to enter it. O represents a hook, upon which the bait is hung, said hook being secured to the side of the box, and over the platform I.

The animal enters the trap through the doorway D, and, passing to the bait, mounts the platform I. As soon as it does this, the shaft H partially revolves, the platform I falls, and the upper end of rod G, moving toward door E, slackens the cord F, so that door E falls and closes the doorway D. The animal is now secure in compartment 1. In endeavoring to escape, he passes under door K, pressing it up, and enters compartment 2, but, in doing this, he bears down the platform J, which throws up platform I, and moves rod G, so as to cause the cord F to raise door E, thus setting the trap again, and, at the same time, by the falling of door K, confining itself in the compartment 2. Thus the operation continues, each animal, as it enters compartment 2, resetting the trap.

R represents a door, which is made in the side of the box, for removing the animal, and which is held in place, when closed, by spring S.

Having thus fully described my improvement, what I claim as new, and desire to secure by Letters Patent, is—

The combination of the box A, with its partition B, shaft H, having platforms I and J inserted directly into said shaft, door K, above platform J, and operated by the rod G and cord F, all constructed and used substantially as specified.

In testimony that I claim the foregoing, I have hereunto set my hand, this 7th day of December, 1867.

A. C. BRIANT.

Witnesses:
BENJ. H. McCREA,
H. W. CHASE.